US009898237B1

(12) United States Patent
Soriano

(10) Patent No.: US 9,898,237 B1
(45) Date of Patent: Feb. 20, 2018

(54) SYSTEM AND METHOD OF PRINTING USING MIXED PAPER SIZES

(71) Applicant: Konica Minolta Laboratory U.S.A., Inc., San Mateo, CA (US)

(72) Inventor: Randy Cruz Soriano, San Leandro, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/707,582

(22) Filed: Sep. 18, 2017

Related U.S. Application Data

(62) Division of application No. 15/278,574, filed on Sep. 28, 2016, now Pat. No. 9,798,505.

(51) Int. Cl.
*G06F 3/12* (2006.01)
*H04N 1/00* (2006.01)

(52) U.S. Cl.
CPC .......... *G06F 3/1252* (2013.01); *G06F 3/1204* (2013.01); *G06F 3/1256* (2013.01); *G06F 3/1285* (2013.01); *H04N 1/00604* (2013.01); *H04N 1/00623* (2013.01); *H04N 1/00639* (2013.01); *H04N 2201/0094* (2013.01)

(58) Field of Classification Search
CPC .... G06F 3/1252; G06F 3/1204; G06F 3/1256; G06F 3/1285; H04N 1/00604; H04N 1/00623; H04N 1/00639; H04N 2201/0094
USPC ....................................................... 358/1.18
See application file for complete search history.

(56) References Cited

U.S. PATENT DOCUMENTS

| 6,406,199 B1 * | 6/2002 | Hayashi ................. G06F 3/1297 270/58.09 |
| 2002/0085223 A1 * | 7/2002 | Bigi ....................... G06F 3/1297 358/1.13 |
| 2008/0088875 A1 * | 4/2008 | Taira .................... G03G 15/6538 358/1.15 |
| 2010/0158591 A1 * | 6/2010 | Otaki ...................... G03G 15/23 399/364 |

* cited by examiner

Primary Examiner — Allen H Nguyen
(74) Attorney, Agent, or Firm — Squire Patton Boggs (US)

(57) ABSTRACT

A system and method of printing involves the use of mixed paper sizes in which the orientation of printing media can be selected to avoid a mixture of paper sheet orientations in the output document when auto tray selection has been selected by a user.

6 Claims, 19 Drawing Sheets

| Example | Input Sheet Size | Print Setting | | Tray Selection by Printer | Printer Output |
|---|---|---|---|---|---|
| | | Paper Tray | Staple | | |
| 1 | Letter | Auto | Yes (left corner) | Letter LEF (first tray) | |
| 2 | Letter | Auto | No | Letter LEF (first tray) | |
| 3 | Legal | Auto | Yes (left corner) | Legal SEF (second tray) | |
| 4 | Legal | Auto | No | Legal SEF (second tray) | |
| 5 | Letter and Legal | Auto | Yes (left corner) | Letter SEF (third tray) / Legal SEF (second tray) | |
| 6 | Letter and Legal | Auto | No | Letter LEF (first tray) / Legal SEF (second tray) | |
| 7 | Letter and Legal | Auto | No | Letter SEF (third tray) / Legal SEF (second tray) | |

FIG. 8

SYSTEM AND METHOD OF PRINTING USING MIXED PAPER SIZES

CROSS-REFERENCE TO RELATED APPLICATION

This application is a divisional of application Ser. No. 15/278,574, filed Sep. 28, 2016, which is incorporated herein by reference.

FIELD

This disclosure relates generally to printing technology and, more particularly, to a printer, method, and program stored in non-transitory computer readable medium for printing using mixed paper sizes.

BACKGROUND

Print jobs may have a mixture of sheet sizes, in particular a mixture letter and legal-sized sheets. Thus, a printer can have trays that store letter- and legal-size printing media. Print jobs may also include print settings in which a user may specify how the print job is to be handled by the printer. For example, the user may specify that printing media from a particular tray be used and/or that the output document be stapled at a particular location. In addition, a print job may include some images that are oriented in portrait mode and others that are oriented in landscape mode. It is desirable for the printer to take into account input sheet sizes, print settings, image orientations, and/or other factors. Also, there is a continuing need to reduce print processing time and/or reduce manual labor in possibly having to rearrange the orientation of sheets in an output document. A reduction in print processing time and manual labor can be particularly important in high volume printing operations, for example.

SUMMARY

Briefly and in general terms, the present invention is directed to a printer, a computer program embodied in a non-transitory computer readable medium, and a method for printing.

In aspects of the invention, a computer program is embodied on a non-transitory computer readable medium having a computer readable program code stored therein for controlling a data processing apparatus capable of communicating with a printer comprising a first tray configured to store letter-sized paper oriented in a long edge feed (LEF) direction, a second tray configured to store letter-sized paper oriented in a short edge feed (SEF) direction, and a third tray configured to store legal-sized paper oriented in the SEF direction. The computer readable program code causes the data processing apparatus to execute a process for submitting a print job to the printer, the process comprising determining whether an auto tray selection has been set for the print job, determining whether a staple mode has been set for the print job, and providing a user notification when it has been determined that both the auto-tray selection has been set for the print job and the staple mode has not been set for the print job, the user notification indicating that letter-sized paper oriented in the SEF direction and obtained from the second tray may be used by the printer for the print job.

The features and advantages of the invention will be more readily understood from the following detailed description which should be read in conjunction with the accompanying drawings.

BRIEF DESCRIPTION OF THE DRAWINGS

FIG. 8 is a table showing exemplary processes for tray selection based in part on input sheet size.

DETAILED DESCRIPTION

As used herein, the term "printer" encompasses a variety of machines capable of forming an image on a paper sheet made of fibrous material, a transparent sheet made of acetate, or other type of printing media. Examples of printers include, without limitation, copying machines wherein physical documents are optically scanned to capture images on the documents so that the images can be duplicated on printing media; laser, inkjet, and other types of printing machines wherein image data of an electronic file, such as a file from a word processing, graphics or other type of computer program, is processed for printing onto printing media; and a multi-function peripheral (MFP) device having the combined functions of a copying machine and printing machine.

As used herein, the term "image" encompasses any one or a combination of photographs, pictures, illustrations, alphanumeric and linguistic characters, symbols, and other graphical representations.

Figure 1:
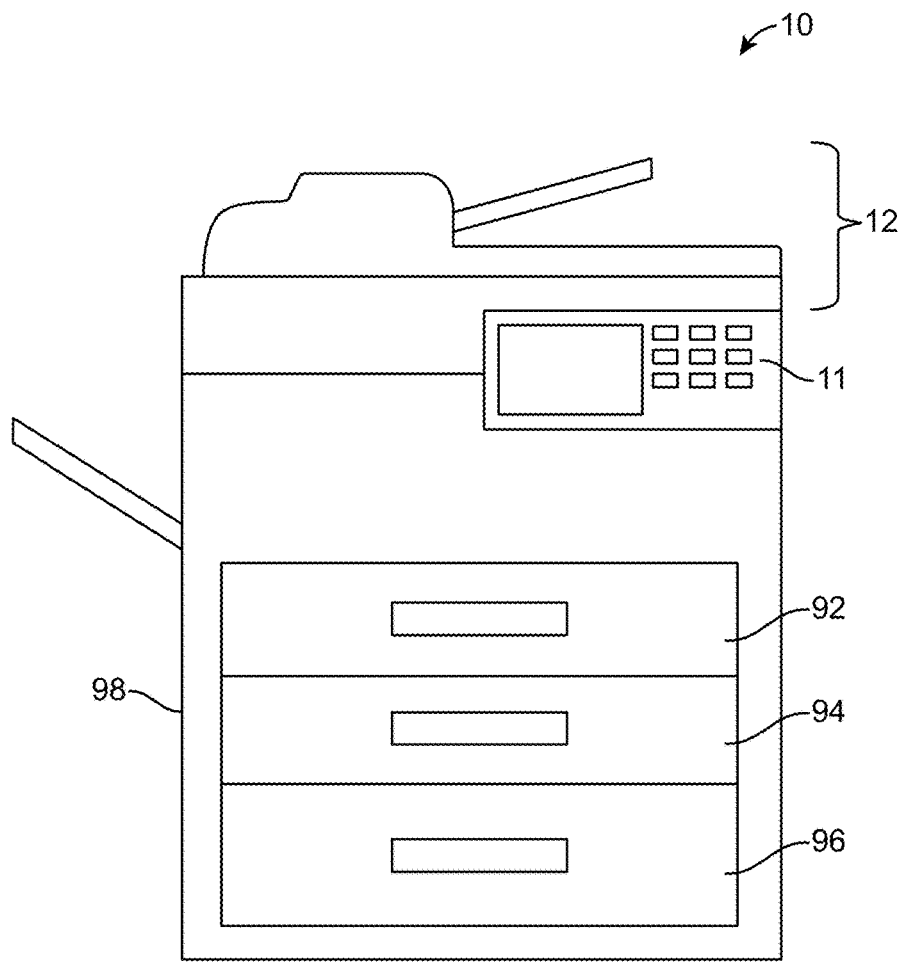
FIG. 1 is a side view of an exemplary printer.

Referring now in more detail to the exemplary drawings for purposes of illustrating aspects of the invention, wherein like reference numerals designate corresponding or like elements among the several views, there is shown in FIG. 1 exemplary printer 10 in the form of an MFP device. It is to be understood that the invention may be embodied in or make use of another type of MFP device, copy machine, or printing machine.

Printer 10 is capable of handling a print job, which can be one that was sent to printer 10 or be a copy job that involves duplicating a physical document placed by a user on printer 10. A print job can be sent by a user to printer 10 from a data processing apparatus (a host computer, for example) for the purpose of printing an electronic document defined in the print job. As used herein, the term "print job" encompasses any of a print job that was sent to printer 10 and a copy job.

As shown in FIG. 1, printer 10 comprises display/control panel 11, image reading assembly 12 for copy jobs, and a plurality of trays 92, 94, 96 which can be pulled out of printer housing 98. The trays hold stacks of printing media of different sizes and orientations. Printing media is usually in the form of blank sheets of paper.

Figure 2:
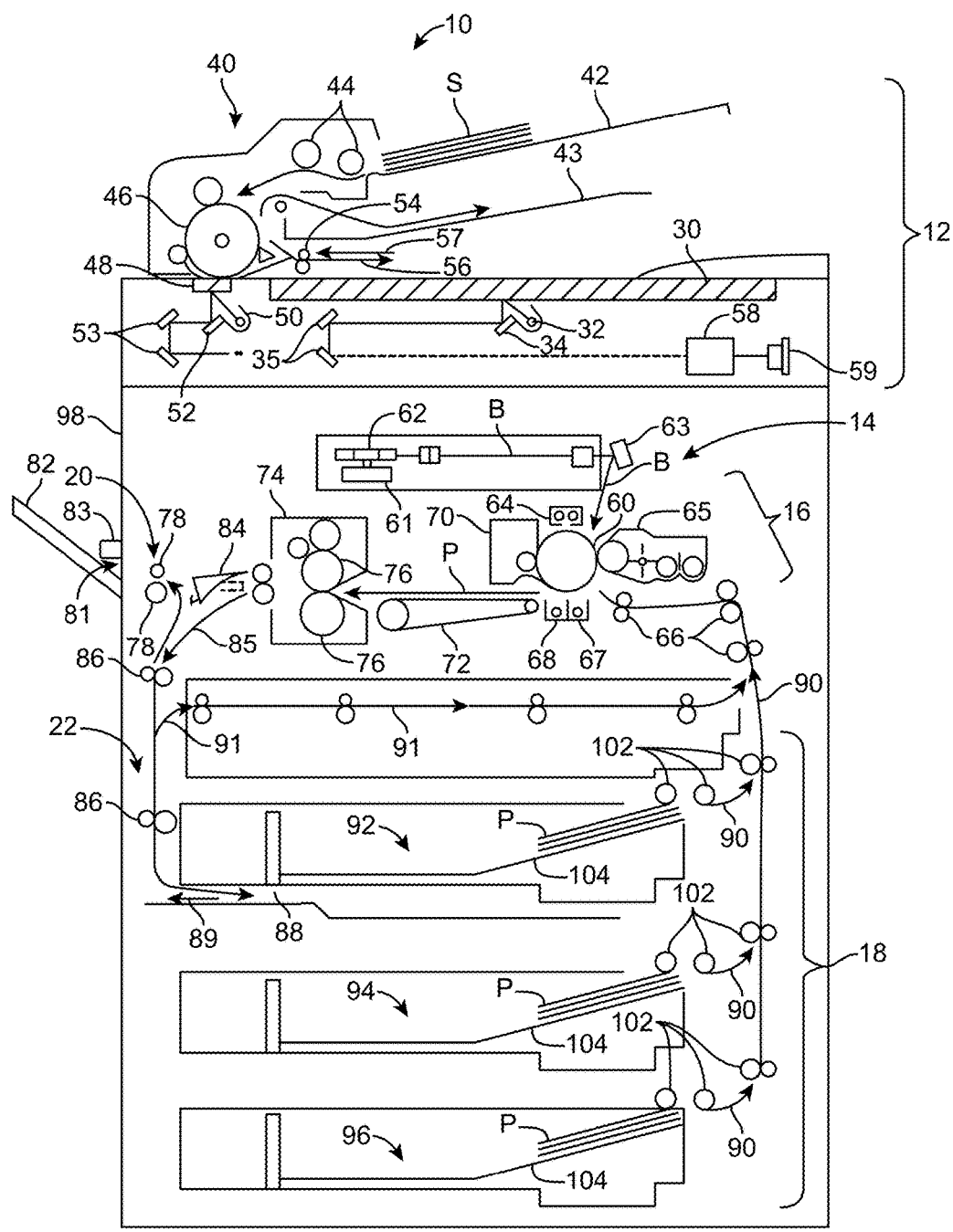
FIG. 2 is a schematic internal view of the printer of FIG. 1.

As shown in FIG. 2, printer 10 further comprises image writing assembly 14, image forming assembly 16, printing media conveyance assembly 18, printing media ejection assembly 20 (at the left side of the figure), and printing media reversing assembly 22. These assemblies are described in turn below.

Image reading assembly 12 reads optical information of one or more images on document S. Document S is a physical document a user has placed on printer 10. Reading is performed by illuminating document S with light and converting the optical information into electrical or digital information. For example, document S may be placed on transparent platen 30 such that the image on document S faces down on platen 30. Optical scanning is performed as follows. Light source 32 projects light on the image-bearing surface of document S. The light arriving at the image-bearing surface of document S is reflected onto mirror 34. The light arriving at mirror 34 includes information about the image on document S. Light source 32 and mirror 34 are configured to move along platen 30, such as by a rail and motor, so that the entire image-bearing surface of document S can be optically scanned while document S remains stationary on platen 30.

Document S can be a stack of sheets of paper. To handle a stack of sheets, printer 10 comprises sheet feeding assembly 40 which separates an individual sheet from the stack of sheets placed on sheet input stand 42. Adjacent to sheet input stand 42 are a series of rollers 44, 46 that pull an individual sheet from the stack of sheets and convey the individual sheet across slit glass 48. Unlike light source 32 and mirror 34, light source 50 and mirror 52 are fixed in position below the slit glass 48. This arrangement allows for continuous optical scanning of the image-bearing surfaces of the sheets as the sheets move across slit glass 48. Each sheet is ejected to sheet ejection stand 43 after the sheet has been optically scanned.

Document S may also have images on both sides of the sheets, so printer 10 may be configured to optically scan both sides of each sheet if desired. The sheet is taken from sheet input stand 42 by rollers 44, 46, which convey the sheet to slit glass 48 where one side of the sheet is optically scanned by light source 50 and mirror 52. After one side has been completely scanned, the sheet is fed out by roller 54 in the direction of arrow 56. Before reaching the end of the sheet, roller 54 reverses direction so that the sheet travels in the direction of arrow 57 and is taken up by roller 46 in such a way that the other side of the sheet is passed across slit glass 48, so the other side of the sheet is optically scanned. Thereafter, the sheet is ejected to sheet ejection stand 43.

Optical information obtained from light emitted from light sources 32 or 50 and reflected from the image-bearing surface of a sheet is captured by mirrors 34 or 52. The reflected light is guided by additional mirrors 35 or 53 through image forming optical system 58 to image pick-up device 59, which is configured to convert incoming photons to electron charges. Exemplary image pick-up devices include without limitation charged-coupled device (CCD) image sensors and complementary metal-oxide-semiconductor active-pixel sensors (CMOS APS). For example, a CCD image sensor may have a photoelectric surface on which a plurality of pixels is arranged, with each pixel represented by a capacitor configured for photoelectric conversion of photons. The optical information defining the image reflected from the image-bearing surface of the sheet is received by the pixels, which convert the optical information into electrical information which can then be read out from the CCD image sensor. The electrical information from the CCD image sensor is processed by the printer processor to form image data. Alternatively, image data may be obtained from a print job that is sent to printer 10 by a data processing apparatus, such as a host computer.

Image writing assembly 14 generates electrostatic latent images based on image data obtained from image reading assembly 12 or a print job. Image writing assembly 14 comprises a laser emitter and various mirrors controlled by motors for guiding laser beam B to photoreceptor drum 60. The obtained image data are used to control the laser emitter and motor 61 which rotates polygon mirror 62. Laser beam B is reflected from polygon mirror 62 and another mirror 63 onto photoreceptor drum 60. Mirror 63 scans laser beam B along the axis of photoreceptor drum 60 to produce an electrostatic latent image on the drum surface that matches the optically scanned image from the sheet of document S or matches an image defined by a print job sent to printer 10.

Before the electrostatic latent image is formed on drum 60, the entire surface of drum 60 is uniformly charged by charging assembly 64. Next, the electrostatic charge on portions of the surface of drum 60 is neutralized by laser beam B which is scanned onto the surface of drum 60 according to the image data obtained from image reading assembly 12 or a print job sent to printer 10. The neutralized areas of drum 60 form the electrostatic latent image.

Still referring to FIG. 2, image forming assembly 16 uses the electrostatic latent image on photoreceptor drum 60 to form a matching toner image on printing media P taken from one of trays 92, 94, 96. Developing assembly 65 delivers charged toner particles to photoreceptor drum 60. The toner particles adhere only to the electrostatic latent image. That is, the toner particles adhere only to areas of the surface of drum 60 where laser beam B has neutralized the electrostatic charge previously applied by charging assembly 64. Image forming assembly 16 also includes various rollers 66 that convey printing media P to drum 60. The toner particles on drum 60 are transferred by transfer assembly 67 onto printing media P. The toner particles adhere to printing media P so that printing media P now carries a toner image that matches the optically scanned image from the sheet of document S or matches an image defined by a print job sent to printer 10.

Separation assembly 68 separates printing media P from photoreceptor drum 60. Separation assembly 68 may include a rotating roller that pulls printing media P from drum 60. Next, cleaning assembly 70, which may include a flexible scraper blade, removes any residual toner on drum 60 to create a cleaned surface so that uniform charging of drum 60 by charging assembly 64 can be repeated.

After printing media P is separated from photoreceptor drum 60, printing media P is conveyed by conveyance mechanism 72 to fixing assembly 74. Conveyance mechanism 72 includes a plurality of rollers which rotate a looped belt. Fixing assembly 74 includes rollers 76 configured to apply pressure and heat to printing media P. The pressure and heat fixes the toner image onto printing media P. Thereafter, printing media P is ejected by rollers 78 of ejection assembly 20 out of housing 98. Printing media P is ejected out of output slot 81 and onto output tray 82 attached to housing 98. Stapler 83 is located at output slot 81 and is configured to apply a staple according to print settings specified by the user.

Transfer of a toner image from photoreceptor drum 60 onto printing media P can be performed for both sides of printing media P. After the toner image is fixed on one side of printing media P, printing media P is conveyed to printing media reversing assembly 22 which includes pivoting guide device 84 that switches the conveying path of printing media P between the printing media reversing assembly 22 and printing media ejection assembly 20. When guide device 84 is in a reversing position, printing media P is conveyed downward as indicated by arrow 85, instead of be conveyed through output slot 81. Printing media P is conveyed by rollers 86 to reversing area 88. After printing media P has moved into reversing area 88 by a predetermined amounted, rollers 86 rotate in the opposite direction to convey printing media P in a reverse direction indicated by arrow 89. Printing media P travels through reverse conveyance path 91 and arrives at the upstream side of drum 60 once again. This time, the opposite side of printing media P faces drum 60 and is subjected to toner image transfer and fixing in the same manner previously described.

Still referring to FIG. 2, trays 92, 94, 96 are configured to store printing media P of different sizes and orientations. Printing media conveyance assembly 18 includes rollers 102 that convey printing media P from trays 92, 94, 96 to photoreceptor drum 60. Each of trays 92, 94, 96 includes floor 104 that raises printing media P into contact with rollers 102.

Exemplary sizes for printing media P include letter-sized paper having dimensions of 8.5 inches×11 inches (21.6 cm×27.9 cm) and legal-sized paper having dimensions of 8.5 inches×14 inches (21.6 cm×35.6 cm). The possible orientations are a long edge feed (LEF) direction and a short edge feed (SEF) direction. The LEF and SEF directions refer to the orientation of printing media P as it is fed through printer 10.

For printing media P that is letter-sized paper, orientation in the LEF direction means that the paper sheet is oriented such that its long edge (i.e., the 11 inch or 27.9 cm edge) is fed first or leads the way along conveying path 90 to photoreceptor drum 60. The long edge is perpendicular to the feed direction along conveying path 90.

For letter-sized and legal-sized papers, orientation in the SEF direction means that the paper sheet is oriented such that its short edge (i.e., the 8.5 inch or 21.6 cm edge) is fed first or leads the way along conveying path 90 to photoreceptor drum 60. The short edge is perpendicular to the feed direction along conveying path 90.

Figure 3:
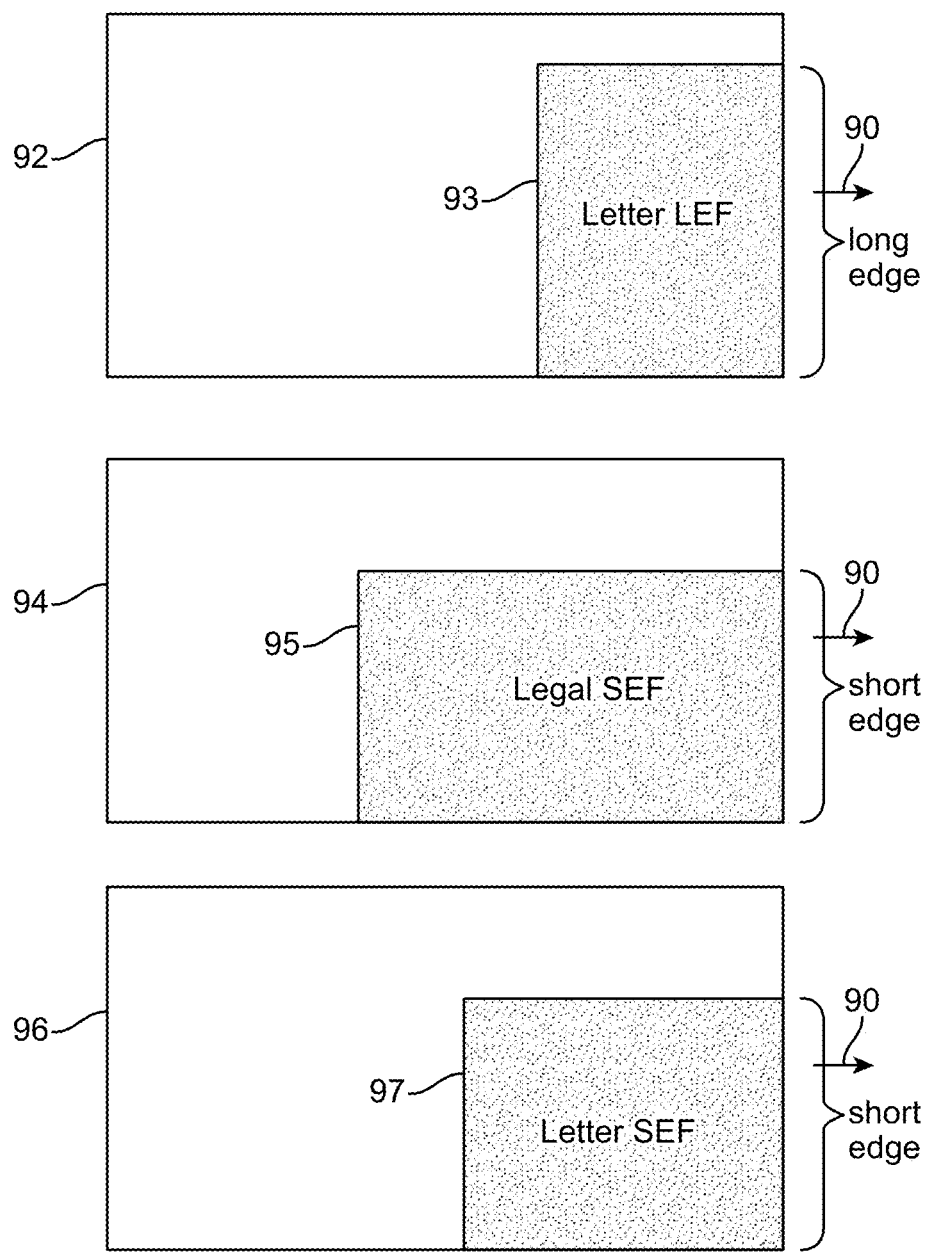
FIG. 3 is a schematic plan view of exemplary first, second, and third trays of the printer of FIG. 1.

As shown in FIG. 3, first tray 92 is configured to store a stack of letter-sized paper 93 oriented in the LEF direction. Second tray 94 is configured to store a stack of legal-sized paper 95 oriented in the SEF direction. Third tray 96 is configured to store a stack of letter-sized paper 97 oriented in the SEF direction.

The designation of trays as "first," "second," and "third" is arbitrary, and the order and arrangement of the trays may be modified. Referring again to FIG. 1, first tray 92 may instead be located in the middle position within printer housing 98, and second tray 94 may be located below or above first tray 92. As a further example, first tray 92 may instead be located at the bottom position within printer housing 98, and second tray 94 may be located at the middle or top position. Other arrangements for the trays are possible.

Figure 4:
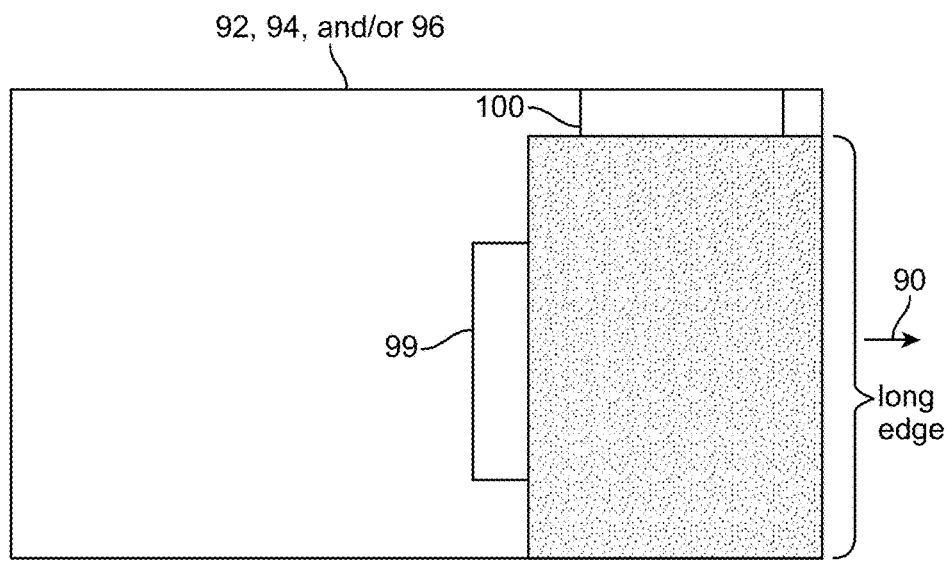
FIGS. 4 and 5 are schematic plan views showing walls within any one of the trays of FIG. 3.

In FIG. 4, one or more of trays 92, 94, 96 may have walls 99, 100 that are fixed and not adjustable in position, such that the tray is configured to hold only one size of printing media P in one particular orientation. In this context, the tray in FIG. 4 can be any one of trays 92, 94, 96 and be configured to hold only letter-sized paper oriented only in the LEF direction.

Figure 5:
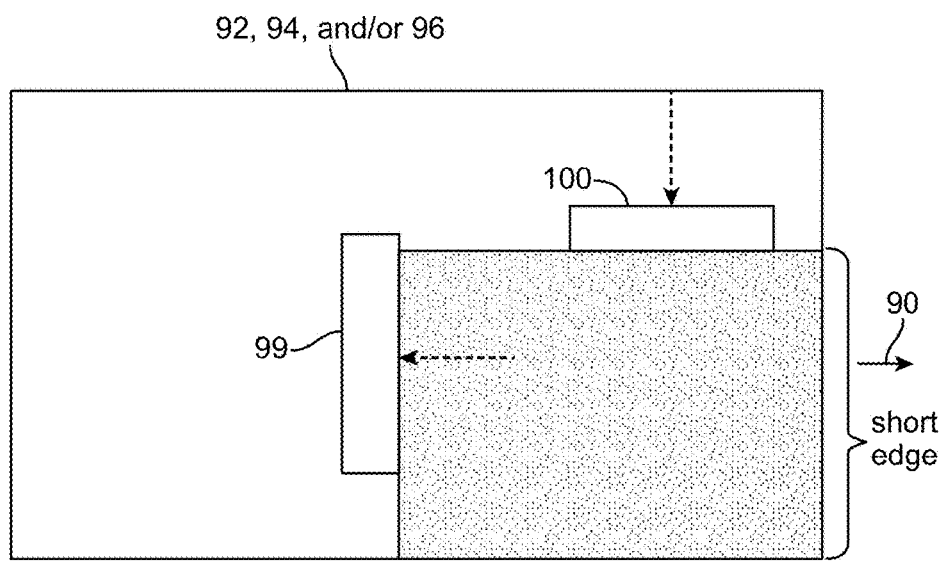

Alternatively, with reference to FIGS. 4 and 5, one or more of trays 92, 94, 96 may have walls 99, 100 that are movable on a rail and can be fixed at a position desired by the user. In this context, walls 99, 100 can be moved from the positions shown in FIG. 4 to the positions shown in FIG. 5. Movable walls 99, 100 allow the tray is be adjusted to hold a desired paper size in a desired orientation. For example, walls 99, 100 of the tray may be adjusted so that the tray is configured to store letter-sized paper oriented in the LEF direction as shown in FIG. 4. Later, walls 99, 100 may be adjusted so that the tray is configured to store letter-sized paper oriented in the SEF direction as shown in FIG. 5.

Figure 6:
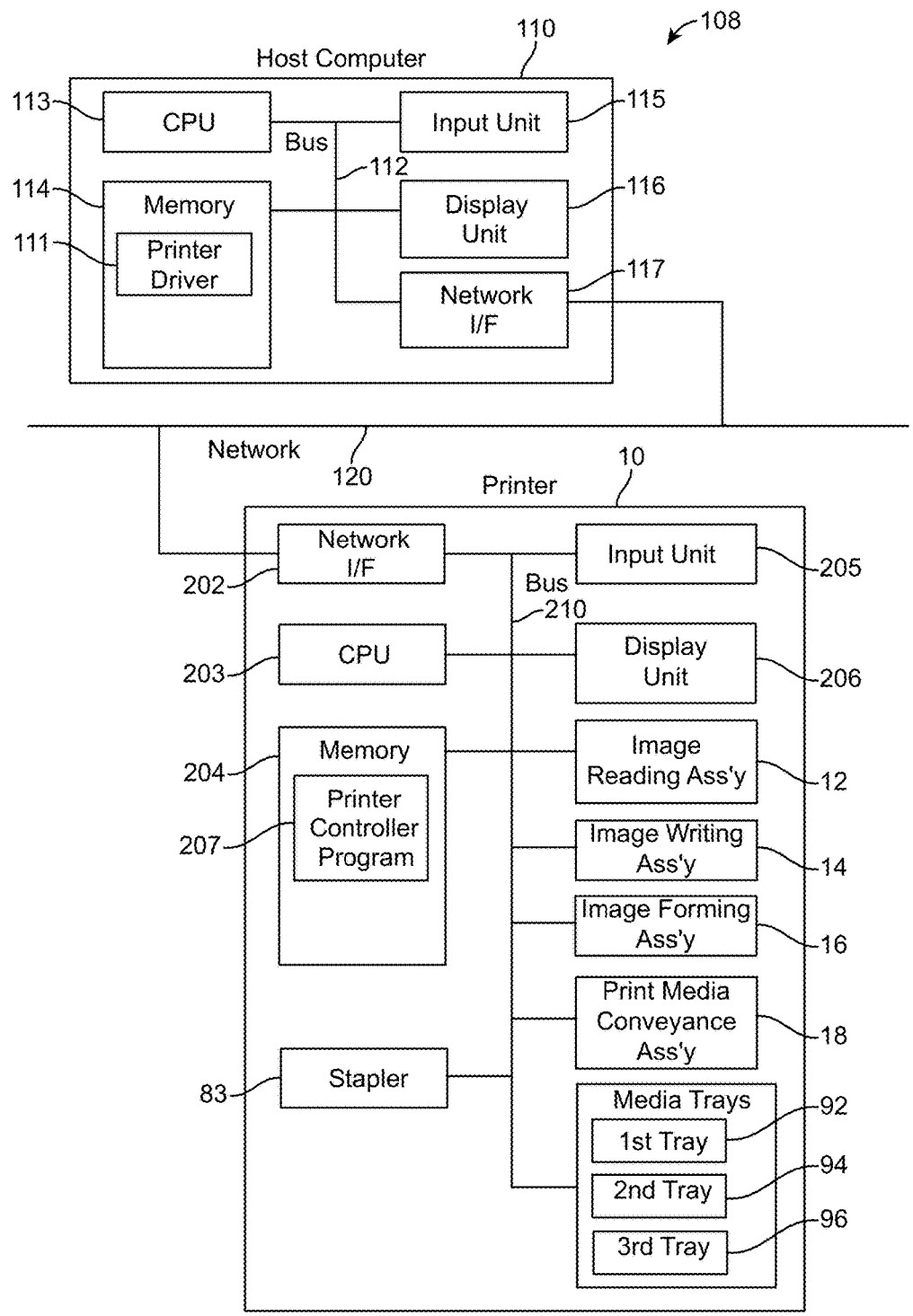
FIG. 6 is a block diagram showing a system having the printer of FIG. 1 in communication with an exemplary host data processing apparatus, such as a host computer.

Referring now to FIG. 6, system 108 comprises printer 10 in communication with host computer 110. Host computer 110 may be a computer workstation, personal computer, laptop computer, tablet, smartphone, or other data processing apparatus. Host computer 110 may include printer driver 111, which is software that receives data and converts the received data to a format that can be used by printer 10 for printing. Optionally, host computer 110 may be running a word processing, graphics, or other computer program which generates the data that is received and converted by printer driver 111. The computer program may have a print function that utilizes printer driver 111.

Communication between printer 10 and host computer 110 is achieved through network 120 that may include wired and wireless communication means known in the art. For example, network 120 may comprise any one or a combination of a local area network (LAN), wide area network (WAN), portions of the Internet, and telephone communication carriers. Network 120 is used by host computer 110 to send a print job to printer 10. Printer 10 may use network 120 to send computer 110 information about the status of the print job.

As shown in FIG. 6, host computer 110 includes elements interconnected by communication bus 112. The elements include central processing unit (CPU) 113, memory 114, input unit 115, display unit 116, and network interface (I/F) 117.

CPU 113 includes one or more computer processors having circuitry that executes instructions of computer programs, such as a printer driver for use with printer 10. CPU 113, which can be referred to as a "host processor," is configured to perform various methods and processes described herein by executing instructions. Instructions executed by CPU 113 include those required for the process of FIG. 16.

Memory 114 includes one or a combination of non-volatile and volatile memory storage devices. Exemplary storage devices include without limitation random-access memory (RAM) modules and read-only memory (ROM) modules, as well as optical, magnetic, and solid-state flash storage devices. Printer driver 111 is stored in memory 114. Instructions required for the process of FIG. 16 may also be stored in memory 114. Input unit 115 allows the user to enter data and interact with host computer 110.

Input unit 115 includes one or a combination of a keypad with buttons and a touch-sensitive screen which are configured to receive user input, such as print settings for a print job. Display unit 116 is configured to display print settings and can be a liquid crystal display or other type of electronic visual display device. Network I/F 117 includes circuitry configured to allow data transfer to and from printer 10 via network 120.

Still referring to FIG. 6, various elements of printer 10 are interconnected by communication bus 210. The elements include network interface (I/F) 202, central processing unit (CPU) 203, memory 204, input unit 205, display unit 206, image reading assembly 12, image writing assembly 14, image forming assembly 16, printing media conveyance assembly 18, stapler 83, and printing media trays 92, 94, 96.

Network I/F 202 includes circuitry configured to allow data transfer to and from host computer 110 via network 120. CPU 203 includes one or more computer processors having circuitry that executes instructions. CPU 203, also referred to as a "printer processor," is configured to perform various methods and processes described herein by executing instructions. Instructions executed by CPU 203 include those required to operate, control, and/or coordinate the various assemblies and components of printer 10 described above. Such instructions are collectively referred to as printer controller program 207.

Memory 204 includes one or a combination of non-volatile and volatile memory storage devices. Exemplary storage devices include without limitation RAM modules and ROM modules, as well as optical, magnetic, and solid-state flash storage devices. Memory 204 may store printer controller program 207 and/or others which when executed, causes printer 10 to perform the methods and processes described herein.

Input unit 205 and display unit 206 may form parts of display/control panel 11 (FIG. 1). Input unit 205 includes one or a combination of a keypad with buttons and a touch-sensitive screen which are configured to receive user input, such as print settings for a copy job. Display unit 206 is configured to display print settings and can be a liquid crystal display or other type of electronic visual display device. When input unit 205 includes a touch-sensitive screen, the touch sensitive screen may be layered over display unit 206 to facilitate user selection of print settings.

Stapler 83 is coupled to CPU 203 to enable stapling of an output document based to print settings. Paper trays 92, 94, 96 may include sensors, such as mechanical arms or optical switches, that detect the printing media size and/or orientation within each tray. Such sensors may be needed if walls 99, 100 of the tray are adjustable. Additionally or alternatively, the sensors may detect whether the tray is empty or in a pulled-out position. Information from the sensors is provided to CPU 203 to allow for proper selection of trays.

Figure 7:
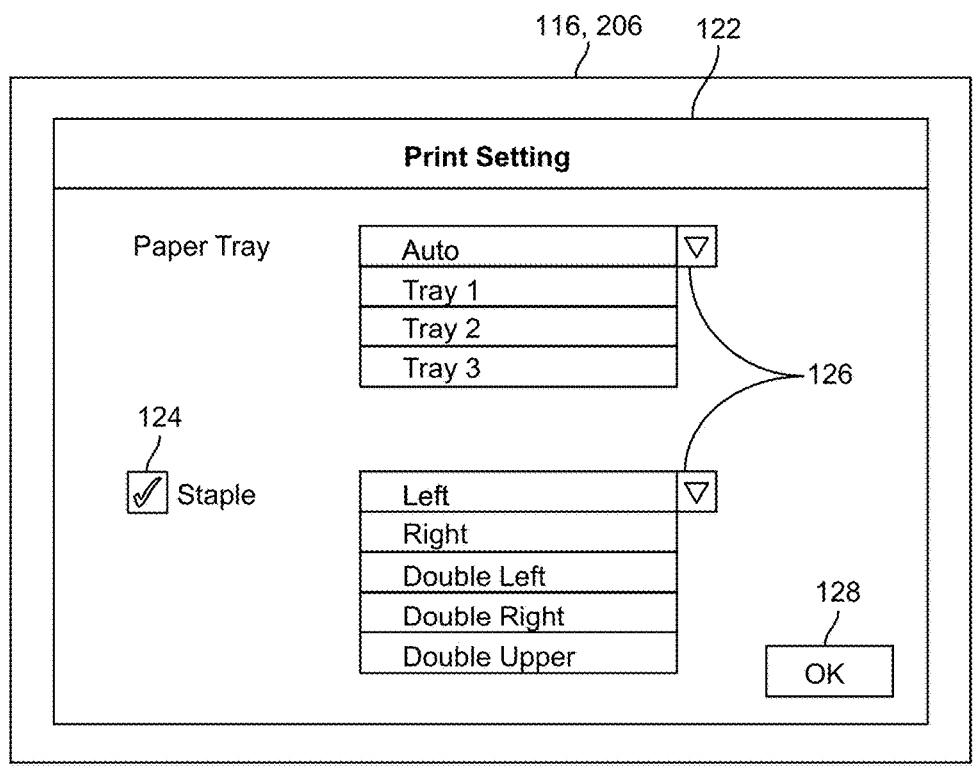
FIG. 7 is diagram showing an exemplary print setting window.

FIG. 7 shows an exemplary print setting window 122 that allows the user to specify print settings for a print job. Window 122 includes various menus to allow the user to specify the tray from which printing media will be taken and to specify whether the user desires stapling to be performed on the printing media as part of a finishing process. By selecting one of the available trays, the user may require printing of a print job to be performed using a specific tray containing a known printing media size and orientation. By selecting "Auto" (auto tray selection), the user allows printer 10 to automatically select the printing media size and orientation that is most appropriate for the print job.

Printer 10 may be designed to minimize print processing time, as will be discussed later, by preferentially selecting the long edge of printing media P to be the feeding edge (i.e., the edge that leads the way along conveying path 90) when a particular printing media size is stored in both SEF and LEF orientations. Thus, when the "Auto" (auto tray selection) has been chosen in FIG. 7 and letter-sized paper is stored in the LEF direction in first tray 92 and stored in the SEF direction in third tray 96, printer 10 will use printing media P obtained from first tray 92 for printing a letter-sized image. Alternatively, printer 10 will obtain printing media P from third tray 96 if the user has chosen "Tray 3" in FIG. 7.

Print setting window 122 may include a variety of graphical user interface (GUI) elements to allow selection of print settings. For example, a selection check box 124 may be activated by the user to specify that stapling is desired. Selection arrow-buttons 126 may be activated by the user to select a printing media tray setting and staple mode. A staple mode refers to the position and, optionally, the number of staples on an output document. Inclusion of a staple mode in a print setting means that stapling is desired by the user. An OK button 128 may be activated by the user to apply the selected print settings.

Printer driver 111 executed by CPU 113 of host computer 110 may cause print setting window 122 to be displayed on display unit 116 of host computer 110. For example, when a user wishes to print an image from host computer 110, print setting window 122 will allow the user to apply print settings for the print job that will be sent from host computer 110 to printer 10.

Software executed by CPU 203 of printer 10 may cause print setting window 122 to be displayed on display unit 206 of printer 10. For example, when a user wishes to copy a document which has been placed on sheet input tray 42 or platen 30, print setting window 122 will allow the user to establish print settings for creating the output document that will provided on output tray 82.

Printer 10 is configured to select the printing media having the appropriate size from a corresponding tray 92, 94, or 96. This is referred to as tray selection. Printer 10 may use various factors for tray selection. An exemplary selection factor is minimization of print processing time. To minimize print processing time, printer 10 may default to selecting paper oriented in the LEF direction in some situations. With paper oriented in the LEF direction, the linear amount of paper, as measured along conveying path 90, that must pass across photoreceptor drum 60 is based on the short edge of the paper. Thus, the linear amount will be reduced as compared to paper oriented in the SEF direction. With this reduction, it may be possible for more sheets of paper to be printed within a given amount of time. Other tray selection factors involve print settings as discussed in the following examples.

FIG. 8 shows examples of possible tray selection processes for print jobs performed by printer 10 according to the factors mentioned above. The input sheet size refers the sheet size that is provided to printer 10. For a copy job, input sheet size refers to the physical sheet sizes of the pages of document S that are fed through printer 10. For a print job sent from host computer 110, input sheet size refers to the detected sheet sizes of images defined in the print job for an electronic document. "Letter" means that the input sheet size for the entire print job is exclusively letter size having dimensions of 8.5 inches×11 inches (21.6 cm×27.9 cm). "Legal" means that the input sheet size for the entire print job is exclusively legal size having dimensions of 8.5 inches×14 inches (21.6 cm×35.6 cm). "Legal and Letter" means that the input sheet sizes for the entire print job are a mixture of letter size and legal size. The printer output could be provided to the user with the front surface of the sheets facing down on output tray 82 (FIG. 2). Thus, the printer output illustrated in the far-right column of FIG. 8 shows the resulting document facing down, as symbolized by the reversed letter B. Stapler 83 is shown in the far-right column to indicate the edge of the output document that is located next to printer output slot 81.

In Example 1, the entire print job is letter size and the user wants the printer output to be stapled on the left corner. Printer 10 selects letter-sized printing media P oriented in the LEF direction which is contained in first tray 92. This selection allows the left corner to be located by stapler 83 at output slot 81 (FIG. 2). Printer 10 selects first tray 92 even when the short edge of document sheets are fed into printer 10 for a copy job. This tray selection process with image rotation (discussed later) allows staple 106 to be placed on the top left corner as required by the staple mode in the print setting.

In Example 2, the entire print job is letter size, and the user has selected auto tray selection and no stapling. With auto tray selection, the user has allowed printer 10 to automatically select the printing media size and orientation deemed most appropriate by the printer for the print job. Printer 10 selects letter-sized printing media P oriented in the LEF direction which is contained in first tray 92. This selection is made to try to minimize print processing time, as previously discussed. Even when the short edges of document sheets are fed into printer 10 for a copy job, printer 10 selects first tray 92 to try to minimize print processing time.

In Example 3, the entire print job is legal size, and the user wants the printer output to be stapled on the left corner. Legal-sized printing media P is stored only in the SEF direction within in printer 10, specifically in second tray 94. Therefore, printer 10 selects legal-sized printing media P oriented in the SEF direction contained in second tray 94. This tray selection process with image rotation (discussed later) allows staple 106 to be placed on the top left corner as required by the staple mode in the print setting.

In Example 4, the entire print job is legal size, and the user has selected auto tray selection and no stapling. Printer 10 selects legal-sized printing media P oriented in the SEF direction contained in second tray 94 since this is the only choice.

Figure 9:
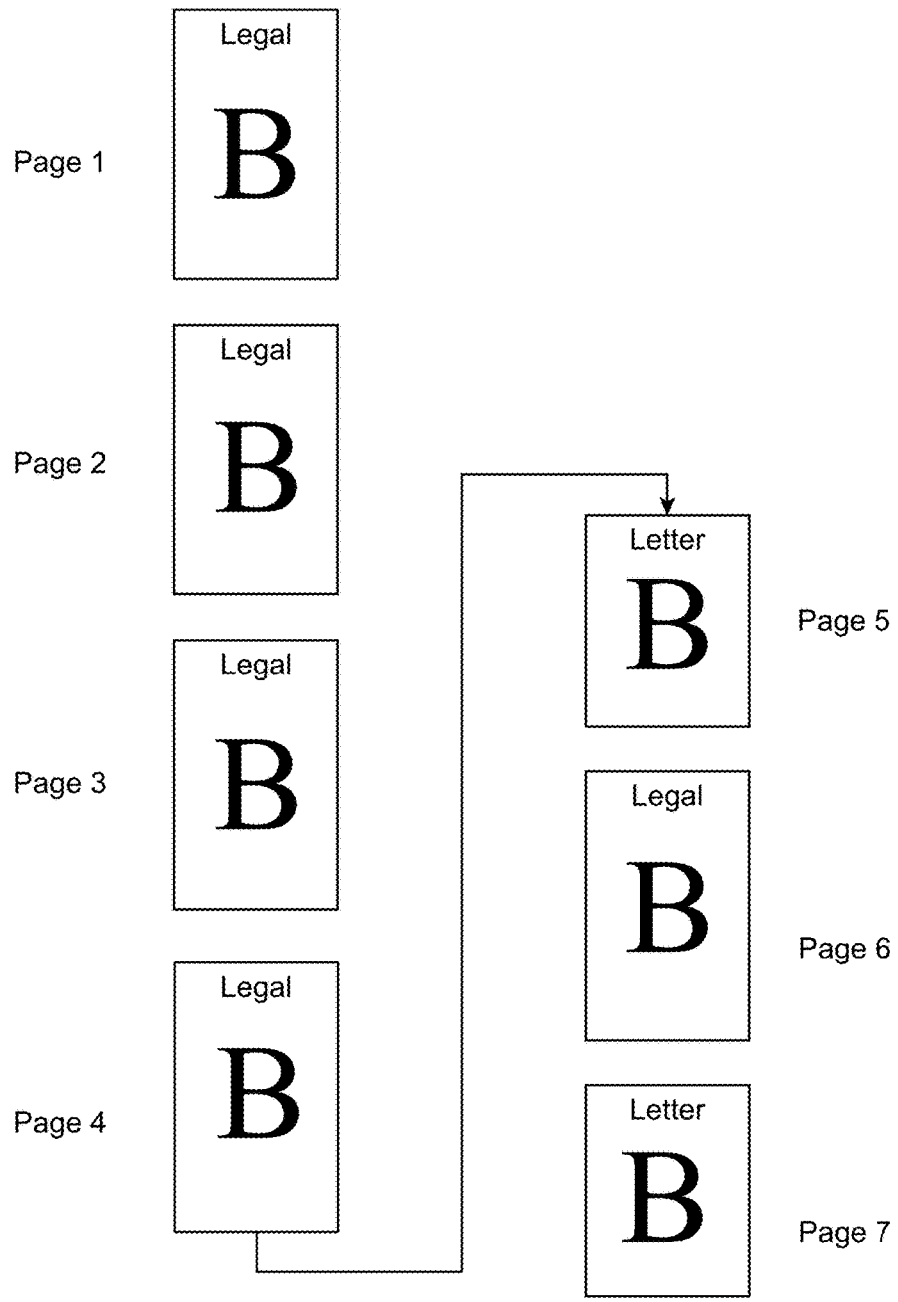
FIG. 9 is a diagram showing an exemplary mixture of input sheet sizes.

In Example 5, the print job is a mix of letter and legal size, and the user wants the printer output to be stapled on the left corner. This situation may arise, for example, when a job is related to a real estate escrow file, which will sometimes include a mixture of paper sizes. For example, pages 1-4 and 6 could be legal size and pages 5 and 7 could be letter size as shown in FIG. 9. For legal size pages, printer 10 selects second tray 94 since this is the only choice. For letter size pages, printer 10 selects letter-sized printing media P oriented in the SEF direction so that the top left corner of all output sheets are aligned for stapling.

Figure 10:
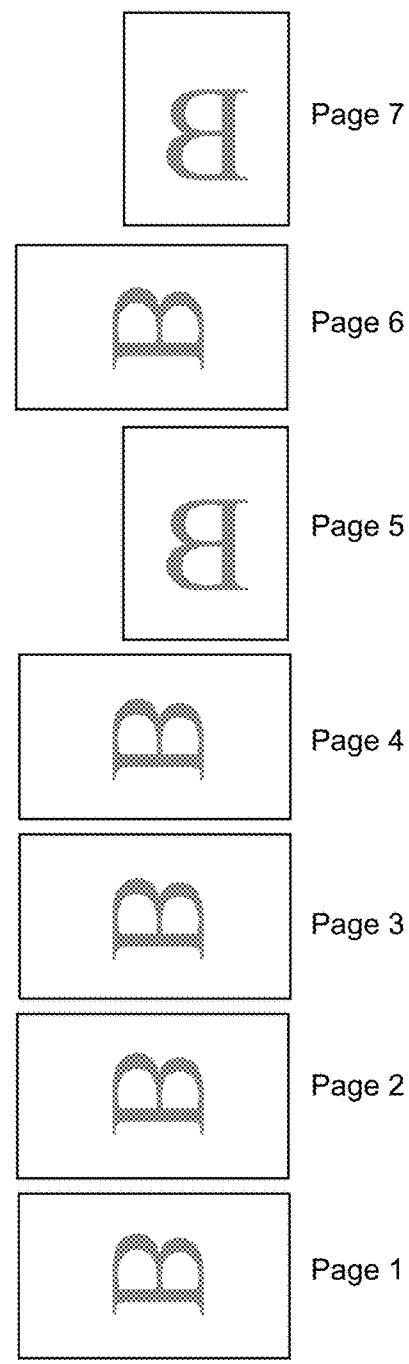
FIG. 10 is a diagram showing an exemplary output document in which long edges of sheets are misaligned according to Example 6 of FIG. 8.

In Example 6, the print job is a mix of letter and legal size, and the user has selected auto tray selection and no stapling. For legal size pages, printer 10 selects second tray 94 since this is the only choice. For letter size pages, printer 10 could select letter-sized printing media P oriented in the LEF direction which is contained in first tray 92. This selection could be made to try to minimize print processing time, but the resulting printer output would have pages having long edges oriented vertically mixed with pages having long edges oriented horizontally. For clarity, the pages of the output document are shown separately in FIG. 10. (The reversed letter B symbolizes that the output document is facing down, as may be provided to the user on output tray 82 of FIG. 2.) This mixture of orientations can make subsequent filing of the output document difficult, and may require the user to manually rearrange the pages so that all the long edges are aligned.

Example 7 addresses the difficulties discussed with Example 6. In Example 7, again the print job is a mix of letter and legal size, and the user has selected auto tray selection and no stapling. For legal size pages, printer 10 selects second tray 94 since this is the only choice. For letter size pages, printer 10 selects letter-sized printing media P oriented in the SEF direction which is contained in third tray 96. This selection is made to avoid the mixture of orientations in the output document. The resulting printer output would have the long edges of all pages aligned. For clarity, the pages of the output document are shown separately in FIG. 11. (The reversed letter B symbolizes that the output document is facing down, as may be provided to the user on output tray 82 of FIG. 2.) There is no need for the user to manually rearrange the pages, which can save a significant amount of time such as in high volume printing operations. Compared to Example 6, Example 7 could be viewed as placing greater priority on avoiding the mixture of orientations in the output document than on trying to minimizing print processing time.

As will be discussed in detail below, rotation of image data can be performed so that printer 10 can handle various print settings. On one hand, it may be desirable to avoid image rotation for the most common situations since image rotation requires the use of greater computing resources and, thus, may adversely affect printing throughput. On the other hand, using printing media oriented in the LEF direction is physically efficient in that it reduces the linear amount of paper, as measured along conveying path 90, that must travel across photoreceptor drum 60. To help minimize print processing time, printer 10 can be optimized for the most common input image orientation and for the most physically efficient printing media orientation. That is, printer 10 can be configured in such a way that rotation of image data is not required for a situation in which the input image is oriented in portrait mode and a matching toner image is to be formed on printing media P oriented in the LEF direction. However, in Example 7, printer 10 uses printing media P oriented in the SEF direction, which means that rotation of the image data may have to be performed in some situations.

Figure 11:
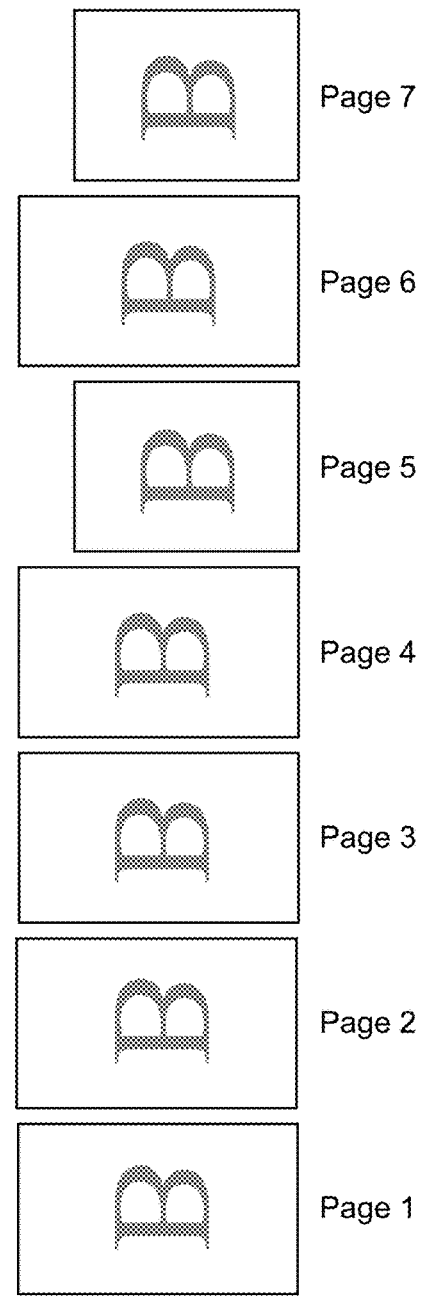
FIG. 11 is a diagram showing an exemplary output document in which long edges of sheets are aligned according to Example 7 of FIG. 8.

Referring again to FIG. 9, the letter B symbolizes the image, which in reality can be any one or a combination of a photograph, picture, illustration, string of alphanumeric and linguistic characters, symbol, and other graphical representation. The orientation of the letter B relative to the edges of the paper sheet indicates that the input image is in portrait mode for all pages (letter- and legal-sized) of a print job. Referring now to FIGS. 8 and 11, recall that in Example 7 printer 10 has selected trays which provide printing media P oriented in the SEF direction. If printer 10 is configured for no rotation of a portrait mode input image when printing media P is oriented in the LEF direction, then printer 10 must rotate a portrait mode input image when printing media P is oriented in the SEF direction. In such a case, CPU 203 of printer 10 may apply a rotational transformation algorithm on the image data (corresponding to FIG. 9, for example) so that the image data are rotated. Next, the rotated image data are used to form an electrostatic latent image on photoreceptor drum 60 so that a correctly oriented toner image is transferred on printing media P (corresponding to FIG. 11, for example).

Figure 12:
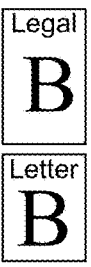
FIG. 12 is a table showing exemplary image rotation processes that are possible for Example 7 of FIG. 8.

As shown in FIG. 12, it is possible for mixed sheet sizes to have input images (also referred to as "image data") which are not in portrait mode for all pages (letter- and legal-sized) as it was in FIG. 9. The image data of mixed sheet size print jobs can be in landscape mode entirely or a mix of portrait and landscape modes. FIG. 12 illustrates various orientation combinations of first image data for a legal-sized page of the print job and second image data for a letter-sized page of the print job.

As used herein with image data, the terms "first" and "second" are arbitrary and do not define the sequential position of pages. The first image data could be for a legal-sized page (for example, page 1 of a document) and the second image data could be a subsequent letter-sized page (for example, page 2 of the document), as shown in FIG. 12. Alternatively, the first image data could be for a legal-sized page (for example, page 15 of a document) and the second image data could be for a previous letter-sized page (for example, page 13 of the document).

The phrase "orientation combination" refers to orientations based on portrait mode and landscape mode. Portrait mode is when the top-to-bottom direction of the image data is parallel to the long edge of the page, and the left-to-right direction of the image data is parallel to the short edge of the page. Landscape mode is when the top-to-bottom direction of the image data is parallel to the short edge of the page, and the left-to-right direction of the image data is parallel to the long edge of the page. For example, image data are in portrait mode when the image data contains English text predominantly having a left-to-right direction that is parallel to the short edge of the page. As a further example, image data are in portrait mode when the image data contains an architectural drawing having a top-to-bottom direction that is parallel to the long edge of the page. The orientation combination may be determined by the printer processor from any one or a combination of encoding contained in the print job and performance by the printer processor of an optical character recognition (OCR) process on the image data.

In Example 7A of FIG. 12, the orientation combination is portrait mode for both first image data for a legal-sized page of the print job and second image data for a letter-sized page of the print job. Example 7A corresponds to the situation previously discussed, in which image data are in portrait mode for all letter- and legal-sized pages of a print job, as shown in FIG. 9. As a result, image data are rotated 90 degrees by CPU 203 before being used to form matching images on legal-sized SEF and letter-sized SEF printing media P. This process results in a desirable arrangement in which left edges (see broken lines) of all portrait output images are aligned in the output document when viewed from the front.

In Example 7B, the orientation combination is landscape mode for both first image data for a legal-sized page of the print job and second image data for a letter-sized page of the print job. This can be referred to as landscape input to SEF output. As previously discussed, portrait input to LEF output requires no image rotation by default, potentially so that printer 10 is optimized for the most common input image orientation (portrait) and for the most physically efficient printing media orientation (LEF). In the case of portrait input to LEF output, the horizontal (left-to-right) direction in the input image is parallel to the printing media feed direction along conveying path 90. The same is true in the case of landscape input to SEF output in Example 7B, so no image rotation is required for Example 7B. In addition, this process results in a desirable arrangement in which top edges (see broken lines) of all landscape output images are aligned in the landscape output document when viewed from the front.

In Example 7C, the orientation combination is portrait mode for first image data for a legal-sized page of the print job and landscape mode for second image data for a letter-sized page of the print job. The portrait mode image data for a legal-sized page are rotated 90 degrees before being used to form a matching image on legal-sized SEF printing media P, similar to Example 7A. The landscape mode image data for a letter-sized page is handled differently than Example 7B since it is usually desired to have the top edge (see broken line) of the letter-sized landscape output image aligned with the left edge (see broken line) of the legal-sized portrait output image. Thus, landscape mode image data for a letter-sized page are rotated 180 degrees before being used to print on letter-sized SEF printing media P.

In Example 7D, the orientation combination is landscape mode for first image data for a legal-sized page of the print job and portrait mode for second image data for a letter-sized page of the print job. It is not necessary to rotate the landscape mode image data for the same reasons given in Example 7B. It is usually desired to have the top edge (see broken line) of the legal-sized landscape output image aligned with the left edge (see broken line) of the letter-sized portrait output image. Thus, portrait mode image data for a letter-sized page are rotated before being used to print on letter-sized SEF printing media P.

The rotation determination column of FIG. 12 is based in part on a default configuration of printer 10 in which portrait input to LEF output requires no image rotation. The default configuration of printer 10 may be different. For example, the default configuration of printer 10 may be such that portrait input to SEF output in Example 7A requires no image rotation, in which case the rotation column for Examples 7B-7C may be altered to provide the desired printer output result.

Figure 13A:
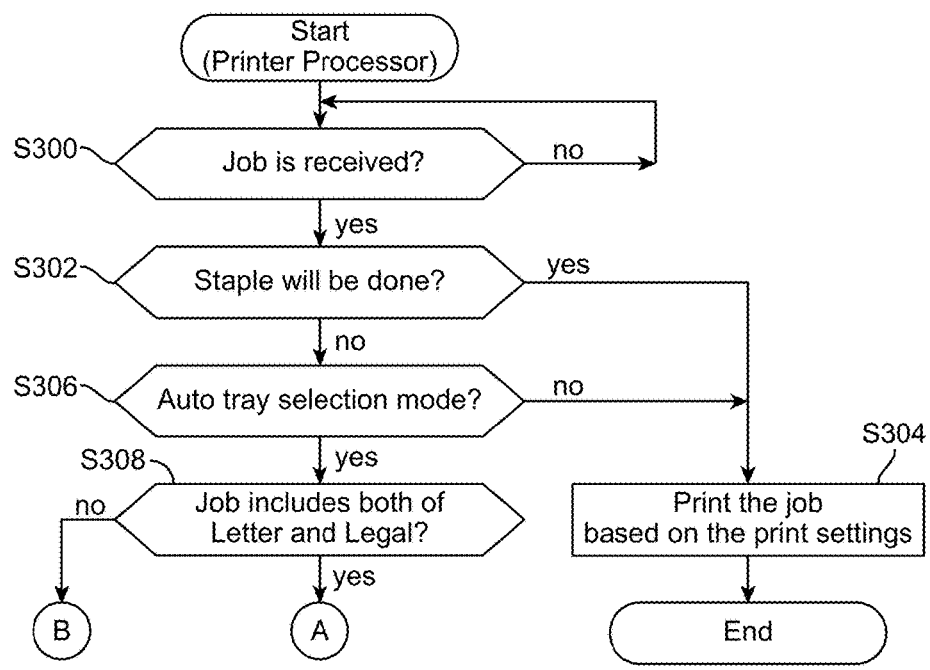
FIGS. 13A-13C are flow diagrams showing an exemplary process that may be performed by a printer.
Figure 13B:
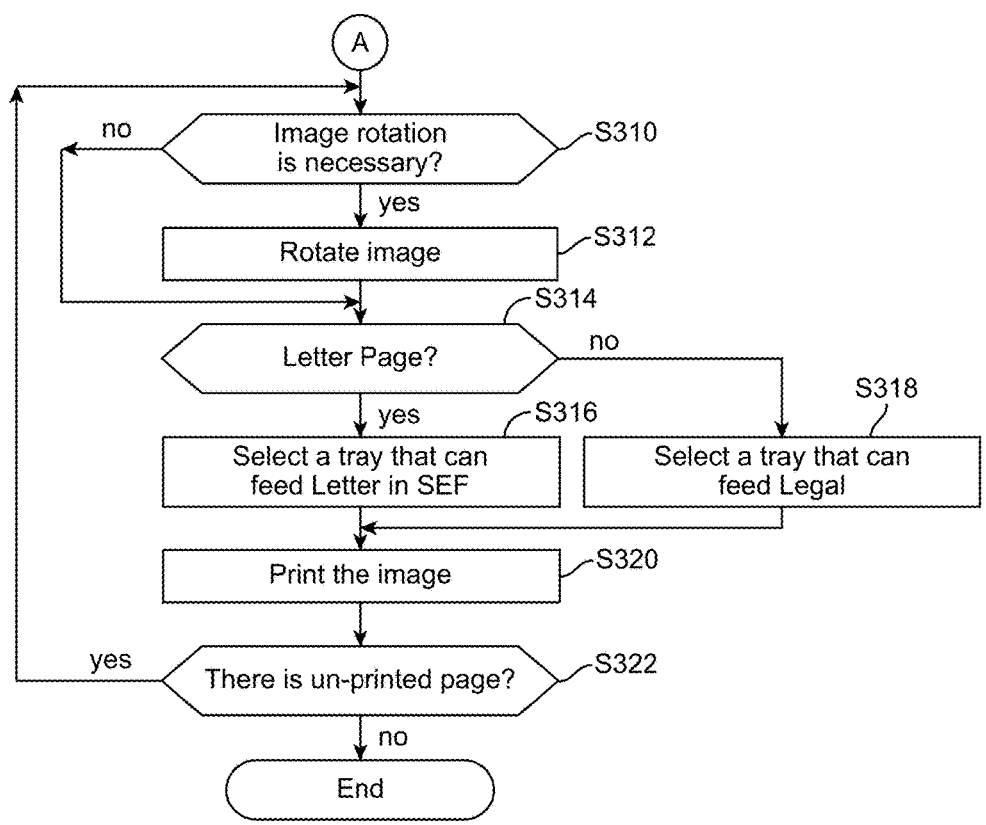
Figure 13C:
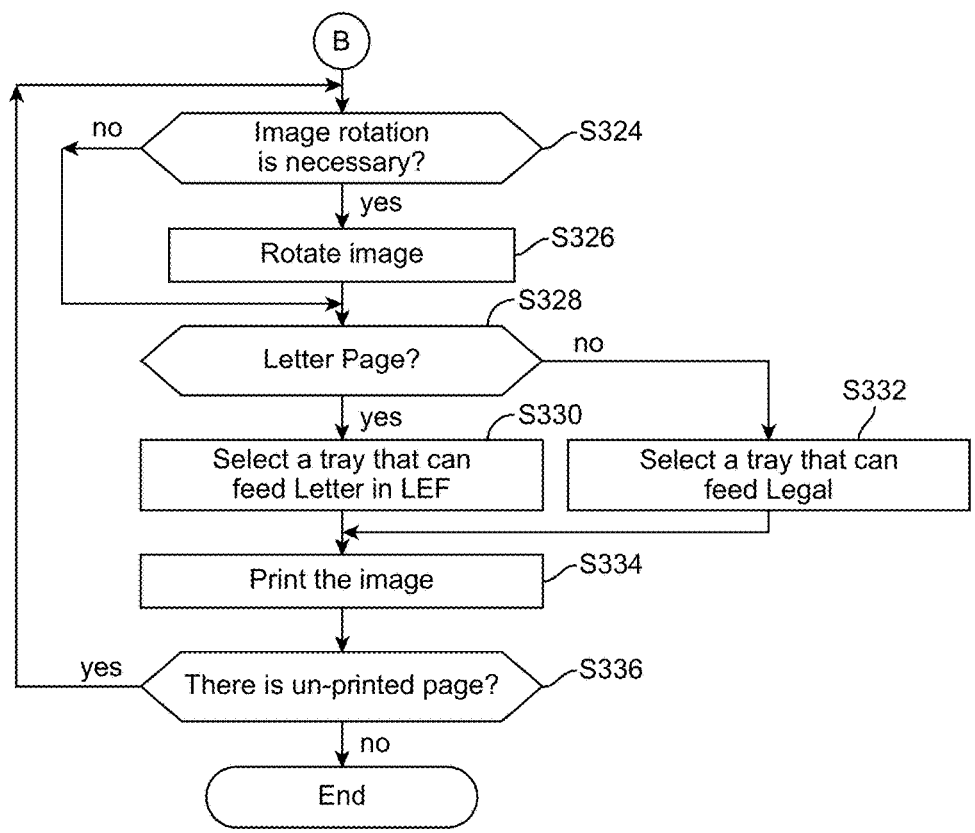

FIGS. 13A-13C show an exemplary process for printing that may be performed by printer 10 or another printer. At S300 a printer processor determines whether a print job has been received, such as from a host computer or other data processing apparatus. An exemplary printer processor is CPU 203 of printer 10. If no print job has been received (S300: NO), the printer processor may continue to monitor for receipt of a print job. If a print job has been received (S300: YES), the printer processor determines at S302 whether stapling will, in fact, be performed according to a print setting for the print job. Even if the print setting specifies stapling, stapling will not be performed if, for example, the staple mode requires two staples (referred to as double stapling) spaced apart along a long edge of a legal-sized sheet but printer 10 stores legal-sized printing media P only in the SEF direction. Other situation may occur in which the print setting specifies stapling but printer 10 is unable to perform stapling.

If stapling will, in fact, be performed (S302: YES), then the printer processor proceeds with printing at S304 according to the print settings. For example, the printer processor may print the print job of Examples 1, 3, and 5 of FIG. 8. If stapling will not be performed (S302: NO), then the printer processor determines at S306 whether auto tray selection has been entered by the user. If auto tray selection has not been entered (S306: NO), then the printer processor proceeds with printing at S304 according to the print settings. If auto tray selection has been entered (S306: YES), then the printer processor determines at S308 whether the print job has a mix of legal and letter sheet sizes. If the input sheet sizes are mixed (S308: YES), the process continues to FIG. 13B. If the input sheet sizes are not mixed (S308: NO), the process continues to FIG. 13C. A difference between FIGS. 13B and 13C is the selection of a letter-sized paper oriented in the SEF direction (FIG. 13B, S116) versus the LEF direction (FIG. 13C, S330).

Referring to FIG. 13B, after the printer processor has determined that input sheet sizes are mixed, the printer processor determines at S310 whether image rotation is necessary. The determination at S310 can be performed according to an orientation combination of first and second image data as described for any one or more of the examples of FIG. 12, or it can be performed according to another method. If image rotation is necessary (S310: YES), the printer processor proceeds to rotate the image at S312, and then determines at S314 whether the current image is letter-sized. If image rotation is not necessary (S310: NO), the printer processor proceeds directly to S314 to determine whether the current image is letter-sized. If the image is letter-sized (S314: YES), the printer processor selects a tray at S316 that is known contain letter-sized paper oriented in the SEF direction. If the image is not letter-sized (S314: NO), the printer processor selects a tray at S318 that is known contain legal-sized paper. After making the tray selection at S316 or S318, the printer processor causes the image to be printed at S320 using the paper obtained from the selected tray. Next, the printer processor determines at S322 whether there are any pages in the print job which have not yet been printed. If there are un-printed pages (S322: YES), the printer processor obtains the image for the next page and returns to S310 to repeat the process for the next page. If there are no un-printed pages (S322: NO), the present process could end.

Referring to FIG. 13C, after the printer processor has determined that input sheet sizes are not mixed (i.e., the input sheet size for all pages of a job are either letter-sized or legal-sized), the printer processor determines at S324 whether image rotation is necessary. The determination at S324 can be performed according to an orientation combination of first and second image data as described for any one or more of the examples of FIG. 12, or it can be performed according to another method. If image rotation is necessary (S324: YES), the printer processor proceeds to rotate the image at S326, and then determines at S328 whether the current image is letter-sized. If image rotation is not necessary (S324: NO), the printer processor proceeds directly to S328 to determine whether the current image is letter-sized. If the image is letter-sized (S328: YES), the printer processor selects a tray at S330 that is known contain letter-sized paper oriented in the LEF direction. If the image is not letter-sized (S328: NO), the printer processor selects a tray at S332 that is known contain legal-sized paper. After making the tray selection at S330 or S332, the printer processor causes the image to be printed at S334 using the paper obtained from the selected tray. Next, the printer processor determines at S336 whether there are any pages in the print job which have not yet been printed. If there are un-printed pages (S336: YES), the printer processor obtains the image for the next page and returns to S324 to repeat the process for the next page. If there are no un-printed pages (S336: NO), the present process could end.

Referring again to FIG. 13B, by selecting letter-sized paper oriented in the SEF direction at S316, it is possible to avoid a mixture of sheet orientations in the output document. As previously discussed, a mixture of sheet orientations in the output document can make subsequent filing of the output document difficult, and may require the user to manually rearrange the pages so that all the long edges are aligned. However, selecting letter-sized paper oriented in the SEF direction may increase print processing time since the linear amount of paper, as measured along conveying path to a photoreceptor drum, will now be based on the long edge of the paper. Therefore, it could be advantageous to provide a query to the user after determining at S308 (FIG. 13A) that input sheet sizes are a mixture of letter and legal size (S308: YES) but before proceeding to FIG. 13B.

Figure 14:
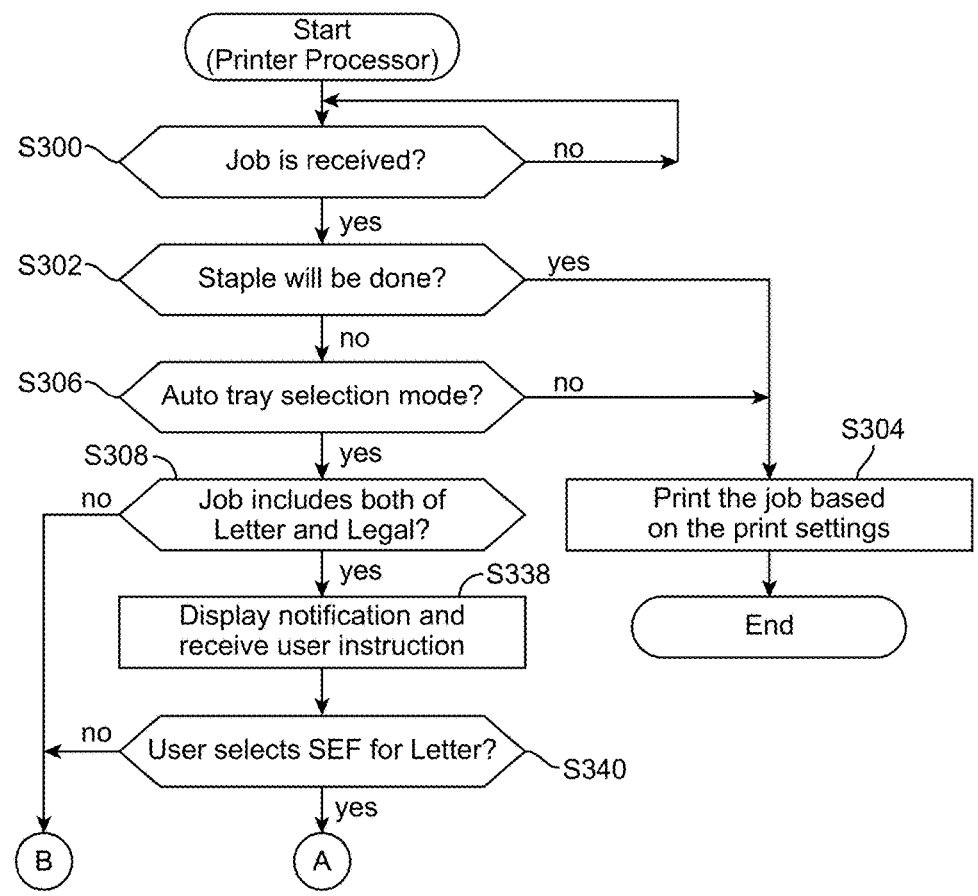
FIG. 14 is a flow diagram showing a modification of FIG. 13A.

FIG. 14 shows a variation of FIG. 13A which implements the query discussed above. FIG. 14 is the same as FIG. 13A except for the addition of blocks S338 and S340. The printer processor determines at S308 whether the print job has a mix of legal and letter sheet sizes. If the input sheet sizes are not mixed (S308: NO), the process continues to FIG. 13C. If the input sheet sizes are mixed (S308: YES), the printer processor executes at S338 a query that includes displaying a notification and receiving the user's instruction.

Figure 15:
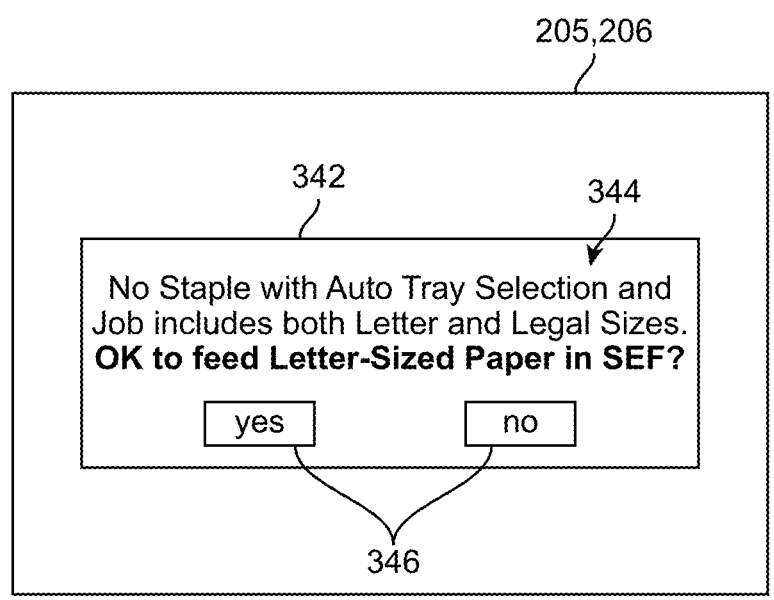
FIG. 15 is a diagram showing an exemplary query window that may be implemented for the process of FIG. 14.

FIG. 15 shows an exemplary query window 342 which includes notification text 344 that asks whether the user will allow letter-sized paper oriented in the SEF direction to be used. Window 342 is displayed on display unit 206, which may have a touch-sensitive input screen layer 205 covering it. Window 342 includes GUI elements, such as YES and NO buttons 346. The user provides the printer processor with a user instruction by pushing either the YES or NO button to indicate whether the user allows use of letter-sized paper oriented in the SEF direction.

Referring again to FIG. 14, the printer processor receives the user instruction at S338 and then determines at S340 whether the user has allowed the use of letter-sized paper oriented in the SEF direction. If the user allowed it (S340: YES), the process continues to FIG. 13B. If the user has not allowed it (S340: NO), the process continues to FIG. 13C instead.

Figure 16:
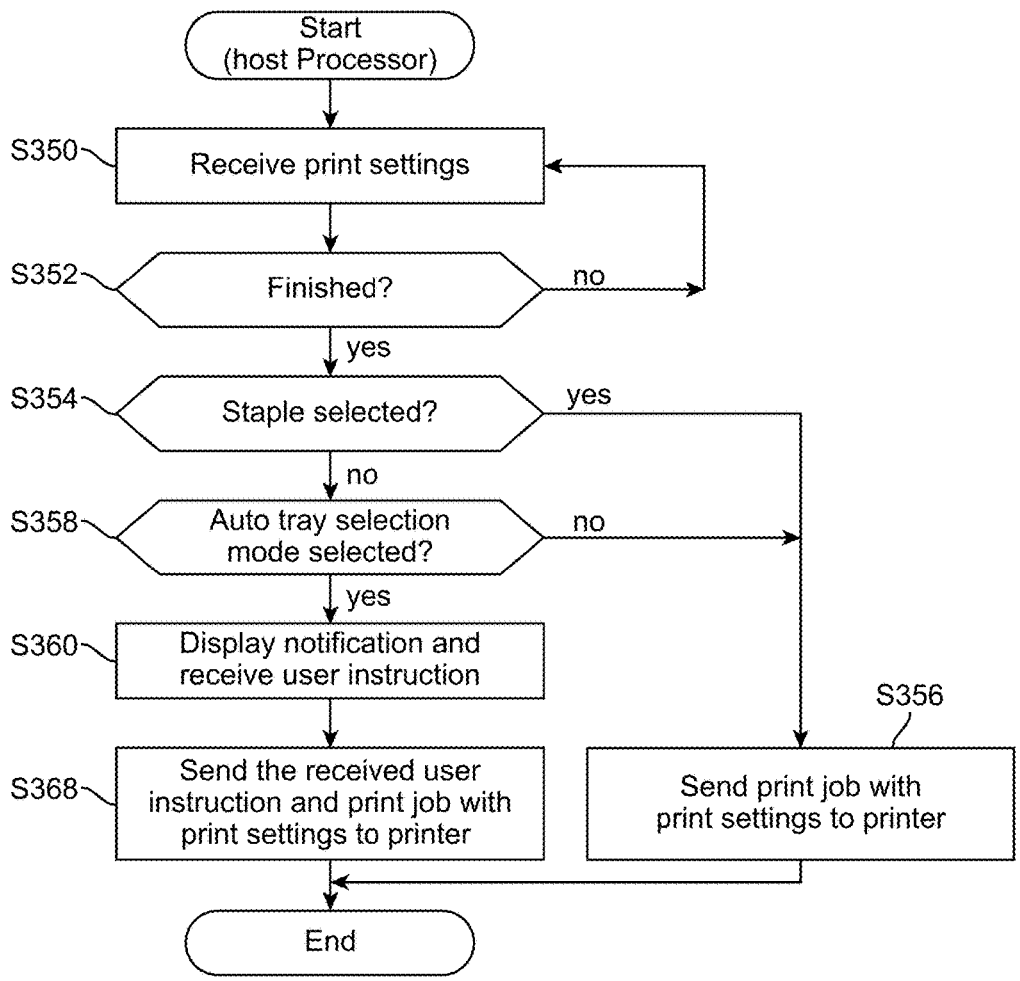
FIG. 16 is a flow diagram showing an exemplary process that may be performed by a host computer or other data processing apparatus in communication with a printer.

FIG. 16 shows an exemplary process for printing that may be performed by host computer 110 or another data processing apparatus in communication with printer 10 or another printer. At S350, the host processor receives various print settings. An exemplary host processor is CPU 113 of host computer 110 executing print driver 111. Print settings can be received via print setting window 122 of FIG. 7, for example. At S352, the host processor determines whether the user has finished entering all print settings. If no, the host processor continues to receive print settings. If yes, the host processor determines at S354 whether the print settings include a staple mode selection. If the print settings include a staple mode selection (S354: YES), the host processor sends the print job with print settings to the printer at S356, after which the present process could end.

If instead the print settings do not include a stapling selection (S354: NO), the host processor determines at S358 whether the print settings include an auto tray selection. If the print settings do not include an auto tray selection (S358:

NO), the host processor sends the print settings to the printer at S356, after which the present process may end.

If instead the print settings include an auto tray selection (S358: YES), the host processor executes at S360 a query that includes displaying a notification and receiving the user's instruction.

Figure 17:
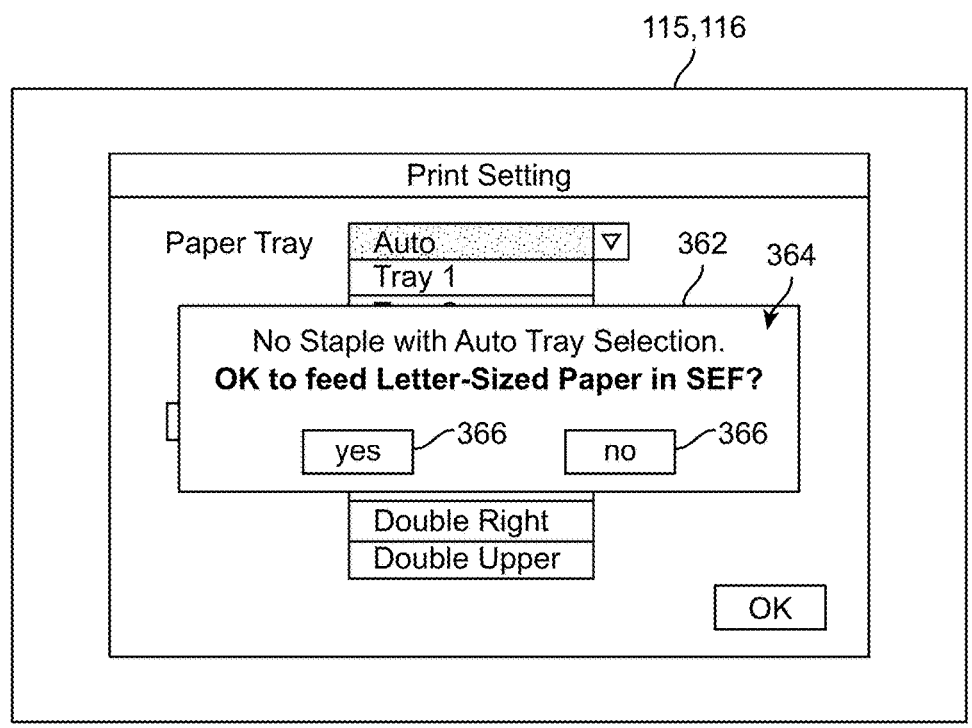
FIG. 17 is a diagram showing an exemplary query window that may be implemented for the process of FIG. 16.

FIG. 17 shows an exemplary query window 362 for S360 in FIG. 16. Window 362 is displayed before the print job is sent to a printer. Window 362 includes notification text 364 that asks whether the user will allow letter-sized paper oriented in the SEF direction to be used. Window 362 is displayed on display unit 116, which may have touch-sensitive input screen layer 115 covering it. Window 362 includes GUI elements, such as YES and NO buttons 366. The user provides the host processor with a user instruction by pushing either the YES or NO button in indicate that the user allows the user of letter-sized paper oriented in the SEF direction.

Referring again to FIG. 16, the printer processor receives the user instruction at S360 and then sends at S368 the received user instruction and the print job with print settings to the printer, after which the present process could end.

Note that in the process of FIG. 16, a user instruction regarding use of letter-sized SEF has been provided to the printer along with the print settings for the print job. Thus, when the printer is handling the print job, there is no need for the printer to display a notification about the use of letter-sized SEF, as was done in S338 of FIG. 14.

Figure 18:
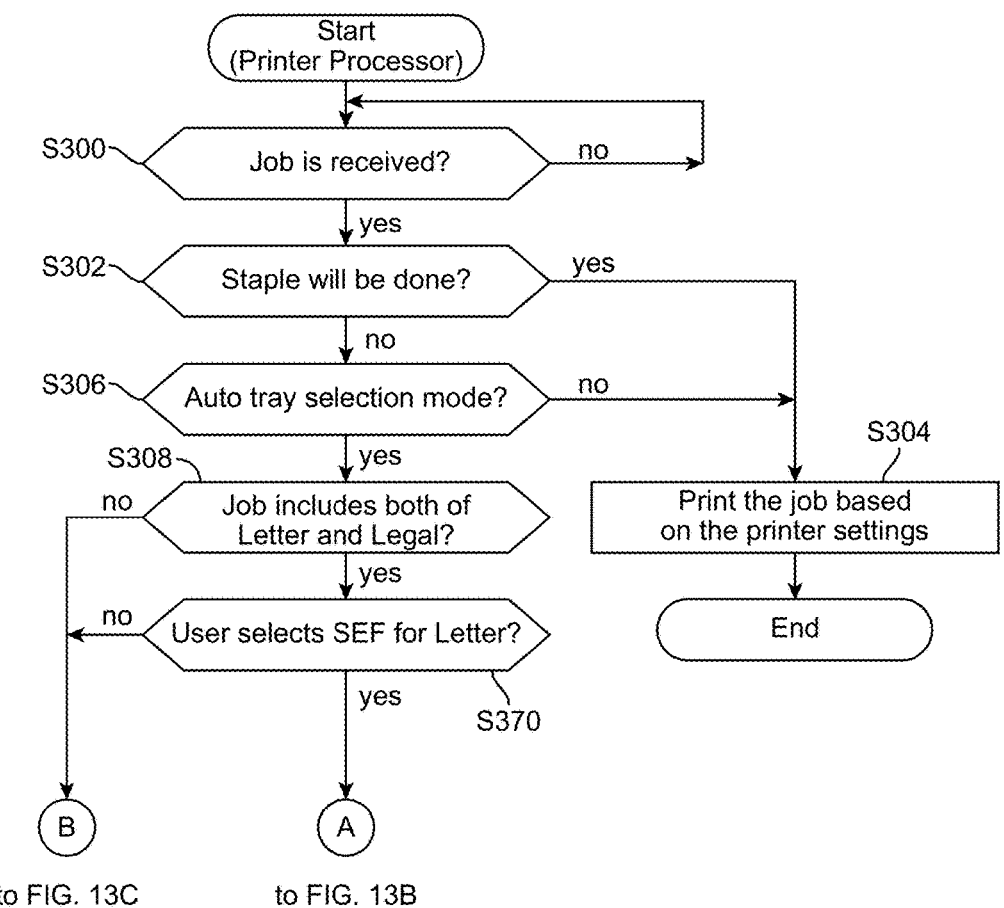
FIG. 18 is a flow diagram showing a modification of FIG. 14.

FIG. 18 shows an alternative to FIGS. 13A and 14, which are processes that can be performed by the printer processor. FIG. 18 is the same as FIGS. 13A and 14 up to S308. If the input sheet sizes are mixed (S308: YES), the printer processor determines at S370 whether the user has allowed letter-sized paper oriented in the SEF direction to be used. The determination at S370 can be made from a user instruction that was sent with the print settings, such as in S368 of FIG. 16. If the user allowed it (S370: YES), the process continues to FIG. 13B. If the user has not allowed it (S370: NO), the process continues to FIG. 13C instead.

As previously mentioned, the invention may be embodied in or make use of another type of MFP device, copy machine, or printing machine. For example, the printer may have a photoreceptor drum that places the toner image on a transfer belt, and then the transfer belt applies the toner image to the printing media obtained from the trays. The printer may be configured to form color images on the printing media, such as by forming a plurality toner images separately for various process colors, such as cyan, magenta, yellow, and black for CMYK printing, followed by combining the toner images on printing media sheet or a transfer belt.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A computer program product embodied on a non-transitory computer readable medium having a computer readable program code stored therein for controlling a data processing apparatus capable of communicating with a printer comprising a first tray configured to store letter-sized paper oriented in a long edge feed (LEF) direction, a second tray configured to store letter-sized paper oriented in a short edge feed (SEF) direction, and a third tray configured to store legal-sized paper oriented in the SEF direction, the computer readable program code causing the data processing apparatus to execute a process for submitting a print job to the printer, the process comprising:
    determining whether an auto tray selection has been set for the print job;
    determining whether a staple mode has been set for the print job; and
    providing a user notification when it has been determined that both the auto-tray selection has been set for the print job and the staple mode has not been set for the print job, the user notification indicating that letter-sized paper oriented in the SEF direction and obtained from the second tray may be used by the printer for the print job.

2. The computer program product embodied on the non-transitory computer readable medium of claim 1, wherein the process further comprises submitting to the printer, the user instruction and the print job in which auto tray selection and staple mode have not been set.

3. The computer program product embodied on the non-transitory computer readable medium of claim 2, wherein the process further comprises receiving a user instruction after providing the user notification, the user instruction indicating whether the user has allowed letter-sized pages of the print job to be printed on letter-sized paper oriented in the SEF direction and obtained from the second tray.

4. The computer program product embodied on the non-transitory computer readable medium of claim 3, wherein the process further comprises submitting to the printer, the user instruction and the print job in which auto tray selection and staple mode have not been set.

5. The computer program product embodied on the non-transitory computer readable medium of claim 1, wherein the process further comprises receiving a user instruction after providing the user notification, the user instruction indicating whether the user has allowed letter-sized pages of the print job to be printed on letter-sized paper oriented in the SEF direction and obtained from the second tray.

6. The computer program product embodied on the non-transitory computer readable medium of claim 5, wherein the process further comprises submitting to the printer, the user instruction and the print job in which auto tray selection and staple mode have not been set.

* * * * *